United States Patent [19]

Takemasa et al.

[11] Patent Number: 5,136,563

[45] Date of Patent: Aug. 4, 1992

[54] MAGAZINE HOLDER IN A CD PLAYER

[75] Inventors: Kaoru Takemasa; Atsushi Kurosawa; Sei Onishi; Kiyohito Kajihara; Osamu Kitazawa; Kiyoshi Morikawa, all of Saitama, Japan

[73] Assignee: Pioneer Electronic Corporation, Tokyo, Japan

[21] Appl. No.: 778,759

[22] Filed: Oct. 18, 1991

Related U.S. Application Data

[63] Continuation of Ser. No. 617,237, Nov. 21, 1990, abandoned.

[30] Foreign Application Priority Data

| Feb. 16, 1990 | [JP] | Japan | 2-35458 |
| Feb. 16, 1990 | [JP] | Japan | 2-35459 |
| Feb. 16, 1990 | [JP] | Japan | 2-35460 |
| Feb. 16, 1990 | [JP] | Japan | 2-35461 |

[51] Int. Cl.$^5$ .............. G11B 17/22; G11B 33/02; G11B 17/04
[52] U.S. Cl. .............. 369/36; 369/38; 369/77.1; 369/178; 369/292
[58] Field of Search ............ 369/33, 34, 35, 36, 369/37, 38, 75.1, 75.2, 77.1, 77.2, 678, 292

[56] References Cited

U.S. PATENT DOCUMENTS

| 4,800,554 | 1/1989 | Yamasaki et al. | 369/36 |
| 4,809,252 | 2/1989 | Ikedo et al. | 369/39 |
| 4,841,499 | 6/1989 | Takahashi et al. | 369/36 |
| 4,847,711 | 7/1989 | Inoue | 369/72 |

FOREIGN PATENT DOCUMENTS 1-109666 4/1989 Japan.

Primary Examiner—Stuart S. Levy
Assistant Examiner—Tan Nguyen
Attorney, Agent, or Firm—Nikaido, Marmelstein, Murray & Oram

[57] ABSTRACT

A CD player has a magazine containing a plurality of trays each of which mounts a CD, and a magazine holder. The magazine holder has an inlet for inserting the magazine. An upper and a lower edges of the inlet has an upwardly inclined guide portion and a downwardly inclined guide portion, respectively.

2 Claims, 20 Drawing Sheets

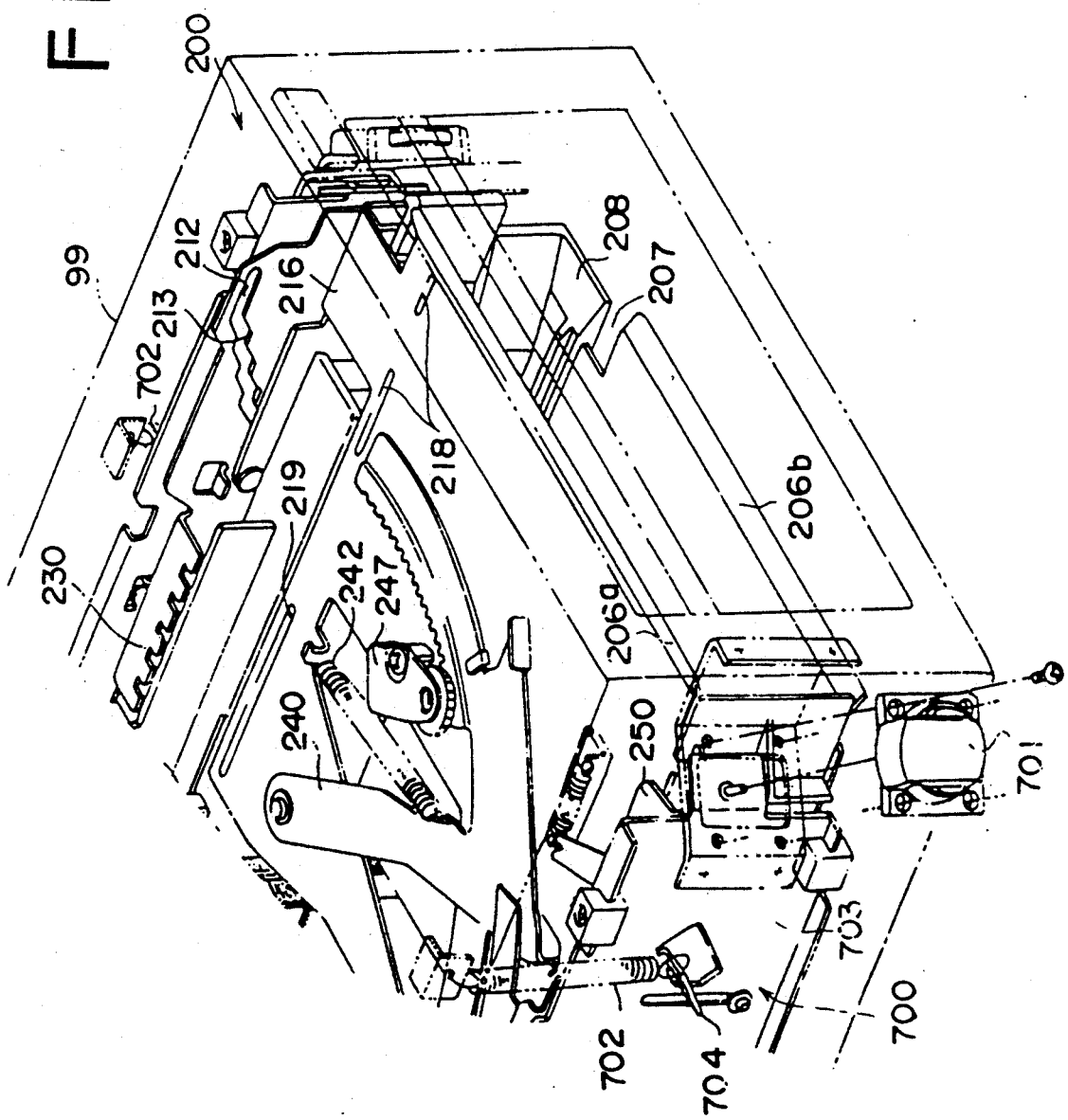

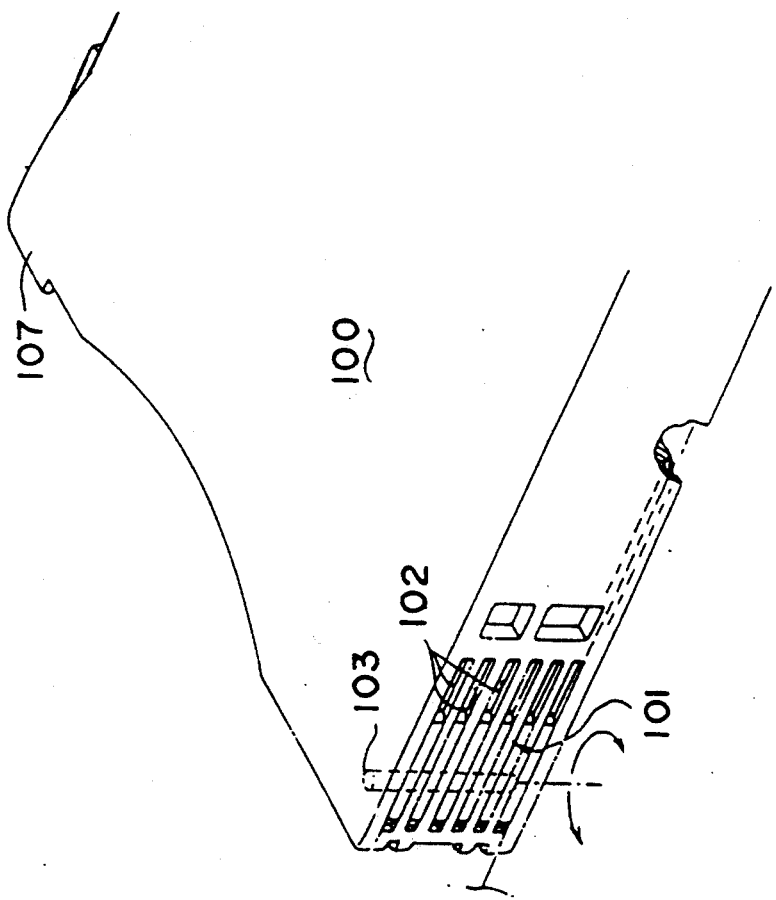

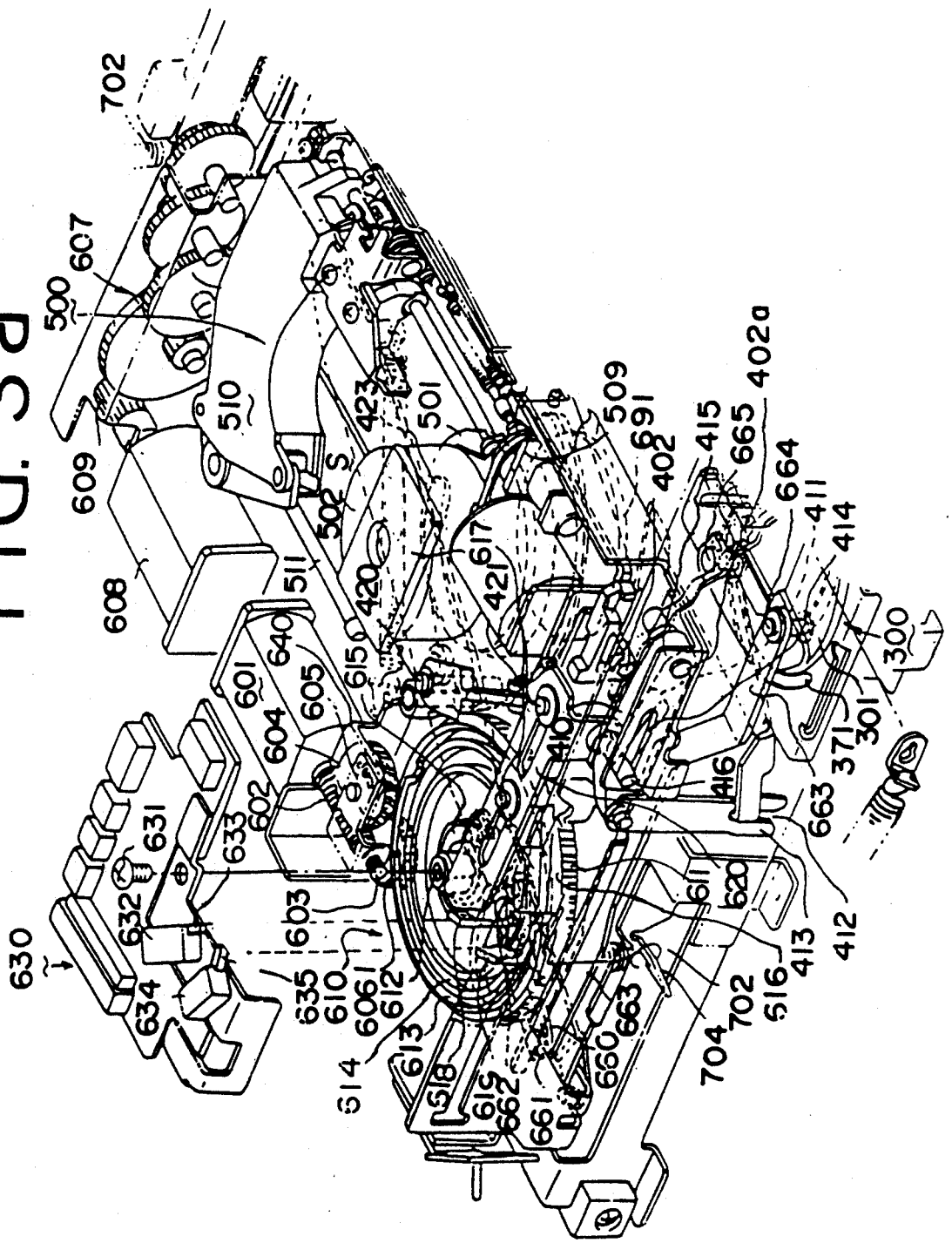

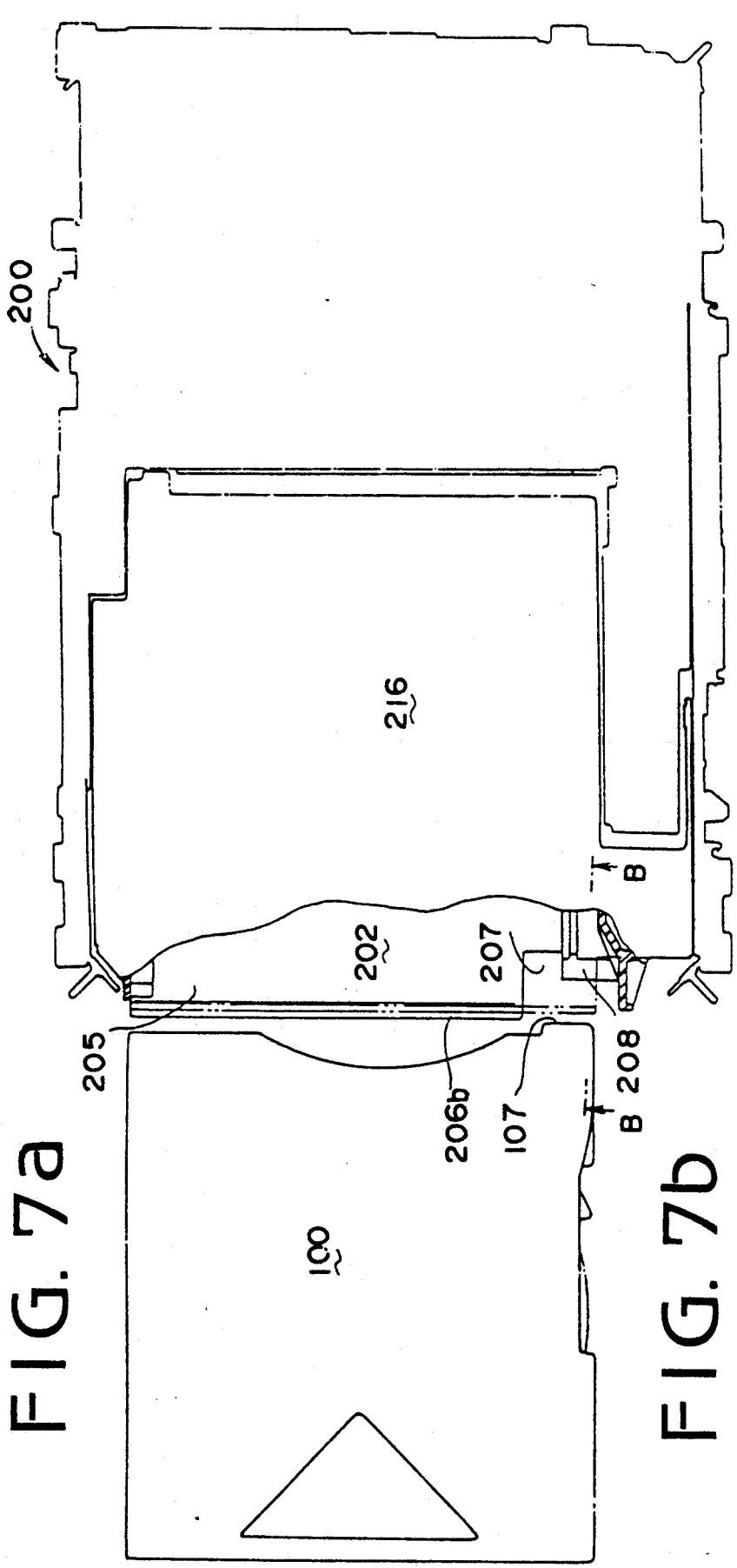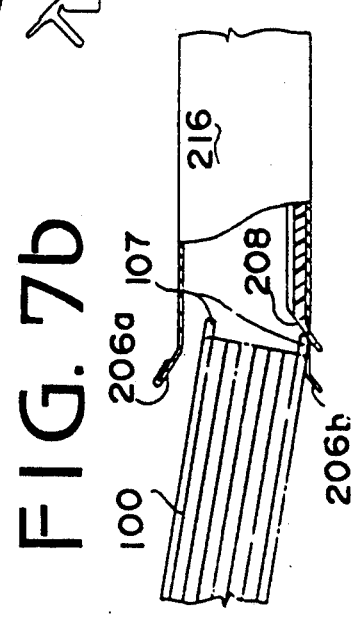

MAGAZINE HOLDER IN A CD PLAYER

This application is a continuation of application Ser. No. 617,237 filed Nov. 21, 1990 now abandoned.

BACKGROUND OF THE INVENTION

The present invention relates to a magazine holder in a compact disk (CD) player for holding a magazine storing a plurality of trays each of which mounts a CD.

A home CD player is designed so as to be horizontally disposed. However, the car CD player is disposed horizontally or vertically depending on the space for arranging the player.

The inventors of the present invention have proposed a CD player where a pickup normally operates either in the vertical disposition or the lateral disposition of the player. For example, Japanese patent application No. 1-109666 discloses such a CD player which is shown in FIG. 22.

Referring to FIG. 22, a car CD player 1 comprises an outer casing 2 and an inner casing 3 mounted in the casing 2. A magazine holder 20 containing a plurality of CDs is provided in the inner casing 3 so as to be able to be vertically moved. The inner casing 3 is supported in the casing 2 through a pair of springs 11 provided between each of the longitudinal inner sides 2a of the casing 2 and opposing outer sides 3a of the inner casing 3. Dampers 4 are provided between the outer casing 2 and the inner casing 3 at the four corners. Each damper 4 is charged with viscous oil such as a silicon oil. A supporting rod 4a provided at one end of the damper 4 is connected to a support plate 3b formed at each corner of the inner casing 3. The other end of the damper 4 is connected to the outer casing 2.

The lower end of each spring 11 is rotatably mounted on a support pin 10 secured on the side 3a. The upper end of the spring is rotatably mounted on a lobe 12a of a rotational disk 12 which is parallel with the side 2a and rotatably mounted on the side 2a of the inner wall of the outer casing 2 through a pin 13 at the center thereof. Each disk 12 has a pair of arcuated slits 14 and 15 formed symmetrically with respect to the pin 13. Each slit 14, 15 extends across an angle of 90 degrees. Guide pins 16 and 17 secured to the sides 2a are engaged with the slits 14 and 15, respectively. The springs 11 in cooperation with the dampers 4 absorb the shocks and vibrations of the vehicle when it is driven.

The CD player 1 is horizontally disposed as shown in FIGS. 22 or vertically disposed in an upright position by rotating the player about a lateral axis 90 agrees and mounted in a trunk of a motor vehicle.

When mounting the CD player 1 in the upright position, the four rotational disks 12 on the sides 2a are rotated 90 degrees in the counterclockwise direction. Thus, the springs 11 extend in the vertical direction, thereby vertically suspending the inner casing 3.

In one lateral side of the inner casing 3 is formed with an opening 5 through which a magazine M is inserted therein. The magazine M has a plurality of vertically layered trays t each of which holds a compact disk d. The CD player 1 is operated through an operation panel provided in the interior of the vehicle to play the required disks d. When the playback is started, a selected tray t is pushed out from the magazine and moved to a playback position shown in the figure through a loading mechanism. The disk d is thereafter rotated at a predetermined speed so that information written on the disk d is read out by a pickup 30.

In the above described CD player, the magazine M is inserted into the magazine holder 20 from an inlet 5 as shown in FIG. 23. When the magazine is inserted, keeping an inclined posture as shown in FIG. 24, an end strikes on an edge of the inlet 5 of the magazine holder 20. In particular, since both ends $M_1$ of the magazine are projected so as to protect a corner of the tray t, the end $M_1$ is liable to strike the edge of the inlet 5.

SUMMARY OF THE INVENTION

The object of the present invention is to provide a magazine holder in which a magazine may be easily and reliably inserted.

According to the present invention, there is provided a magazine holder in a CD player having a magazine containing a plurality of trays each of which mounts a CD, comprising the magazine holder having an inlet for inserting the magazine, an upper and a lower edges of the inlet having an upwardly inclined guide portion and a downwardly inclined guide portion, respectively.

In an aspect of the invention, one of the upper and lower edges has a recess opposing a projection formed on the magazine.

The other objects and features of this invention will become understood from the following description with reference to the accompanying drawings.

BRIEF DESCRIPTION OF THE DRAWINGS

FIGS. 1a and 1b show a perspective view of a whole of a car CD player according to the present invention;

FIGS. 2a and 2b show a perspective view of the car CD player and a magazine;

FIGS. 3a and 3b show an exploded perspective view of the car CD player;

FIG. 7a is a plan view showing a magazine holder;

FIG. 7b is a sectional view taken on line B—B of FIG. 7a;

DETAILED DESCRIPTION OF THE PREFERRED EMBODIMENT

Figure 1A:
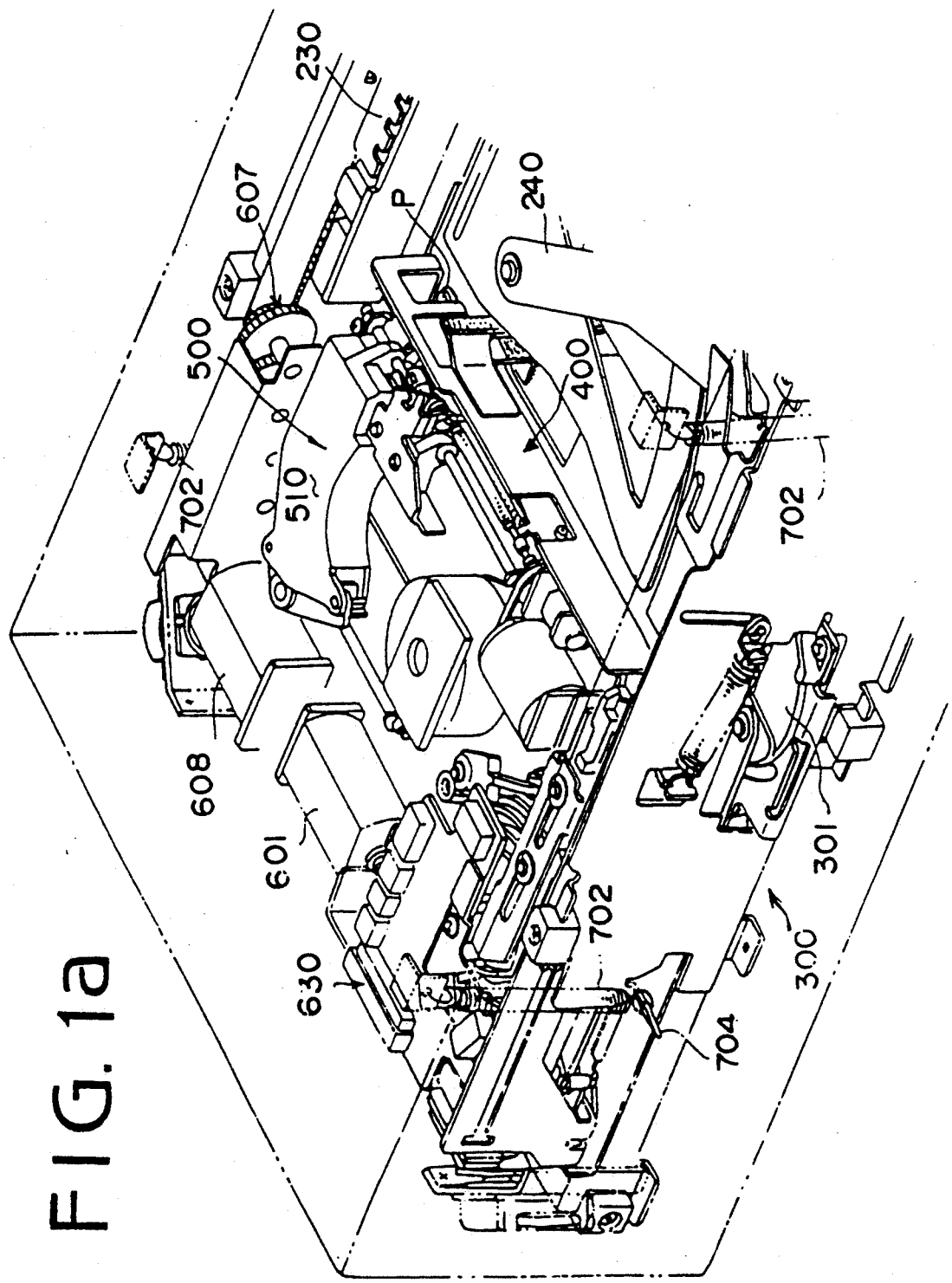

Referring to FIG. 1, the car CD player is adapted to be mounted in a trunk of a motor vehicle and remotely controlled by operating a control unit mounted in a dashboard. The CD player comprises a magazine mounting device 200 having a magazine holder 216 for mounting a magazine 100 (FIG. 2), a loading device 300 for loading a selected tray in the magazine, a clamp device 400 for removing a CD from the tray and clamping it to a turntable, and a reproducing device 500 having a pickup 510. These components are housed in a frame 700 supported in a casing 99 through dampers 701 and damping springs 702. A spring retainer 704 for the damping spring 702 is projected at 45 degrees from each side plate 703 of the frame 700.

Figure 4:
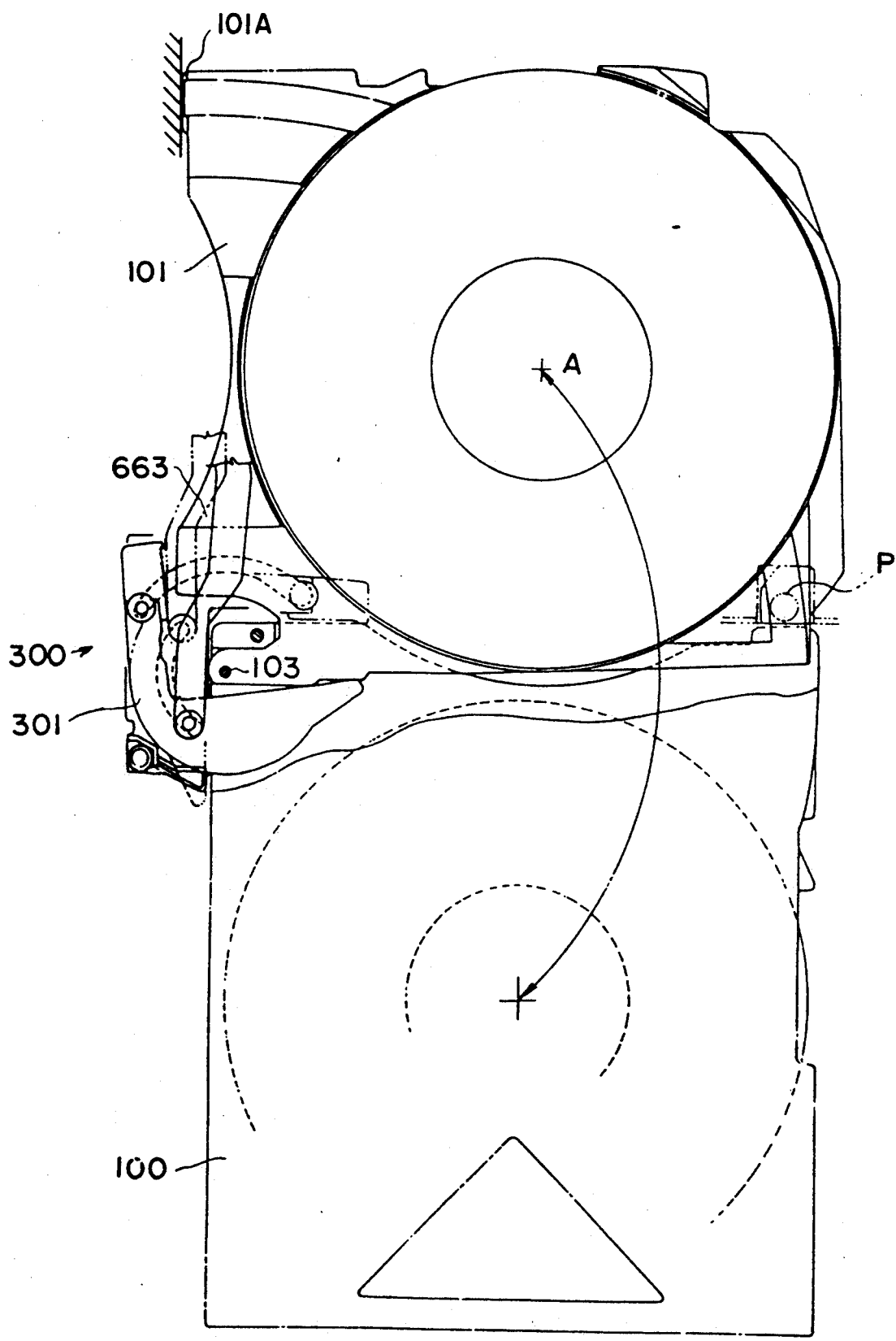
FIG. 4 shows a device for moving a tray mounting a CD between the magazine and a playback position.

Referring to FIGS. 2 and 4, a plurality of trays 101 are housed in the magazine 100. The magazine has openings 102 at a side thereof, corresponding to the trays. A loading lever 301 of the loading device 300 engages one of the trays 101 through the opening 102, and causes it to rotate about an axis 103 (as shown by an arrow) to a playback position A in the player where the tray 101 is stopped in a predetermined position by an abutment 101A.

Figure 3B:
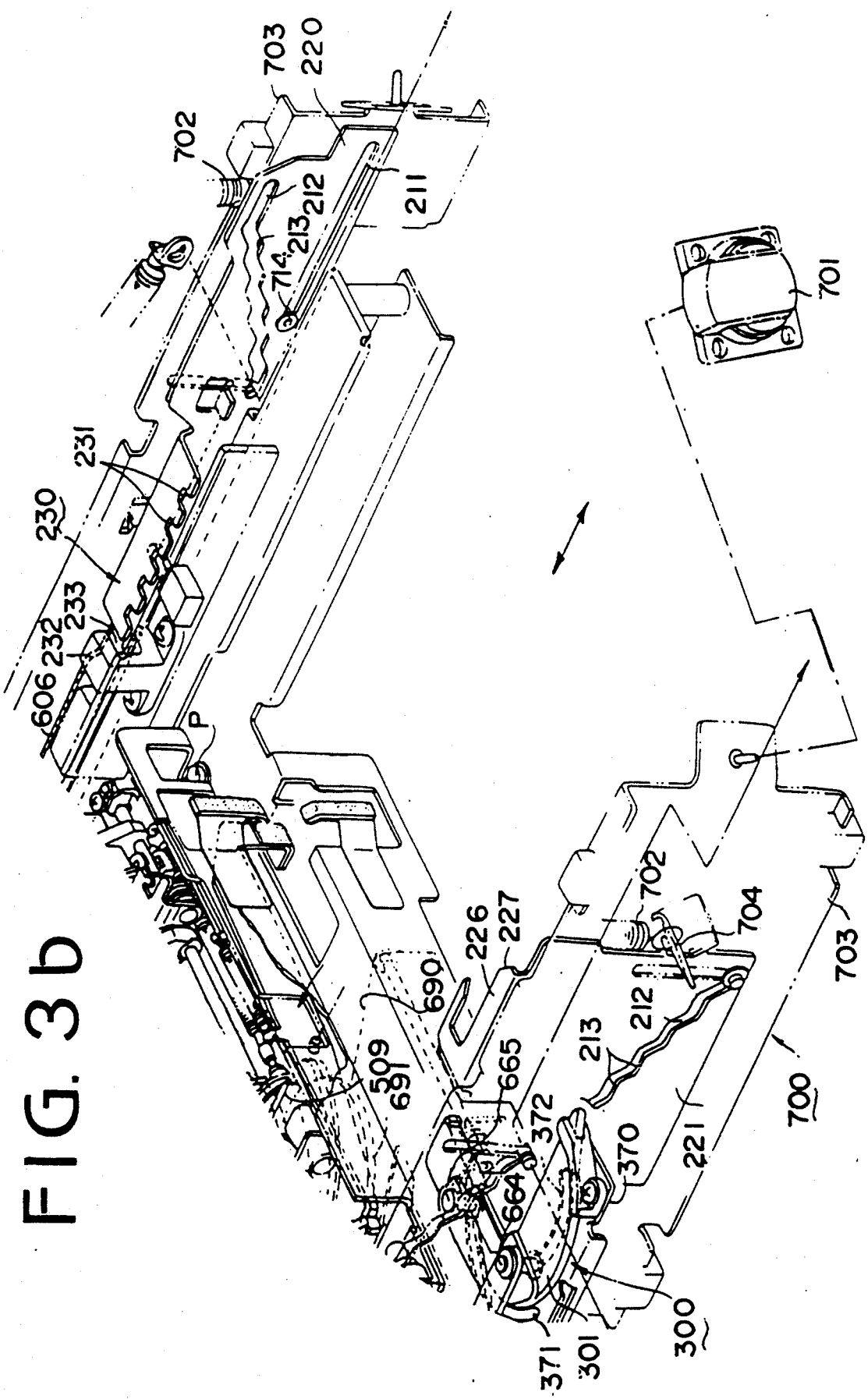
Figure 5:
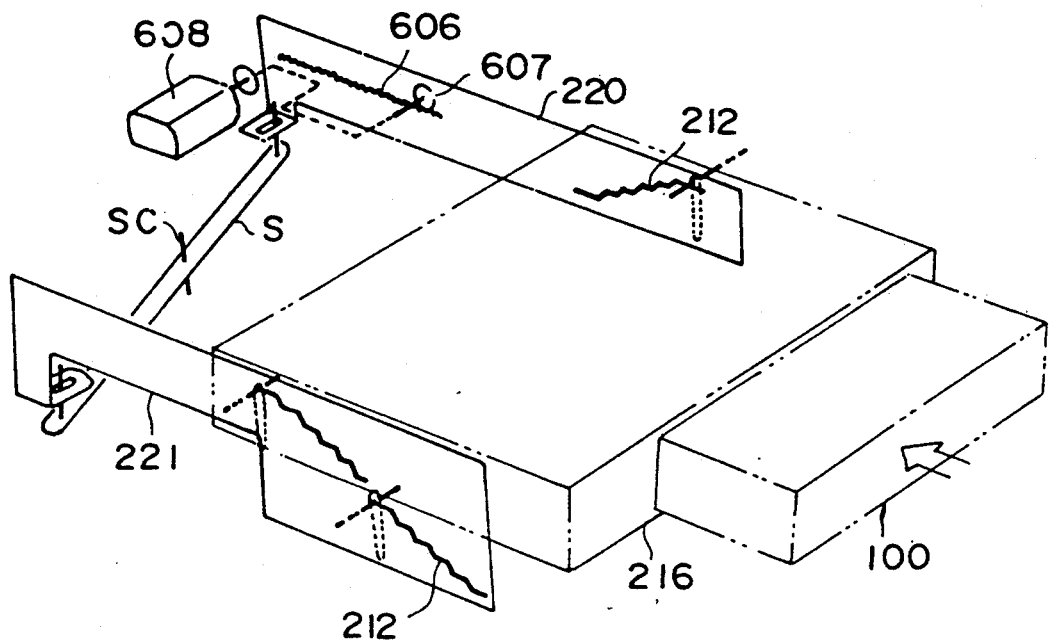
FIGS. 5 and 6 are perspective views showing a magazine holder elevating device.
Figure 6:
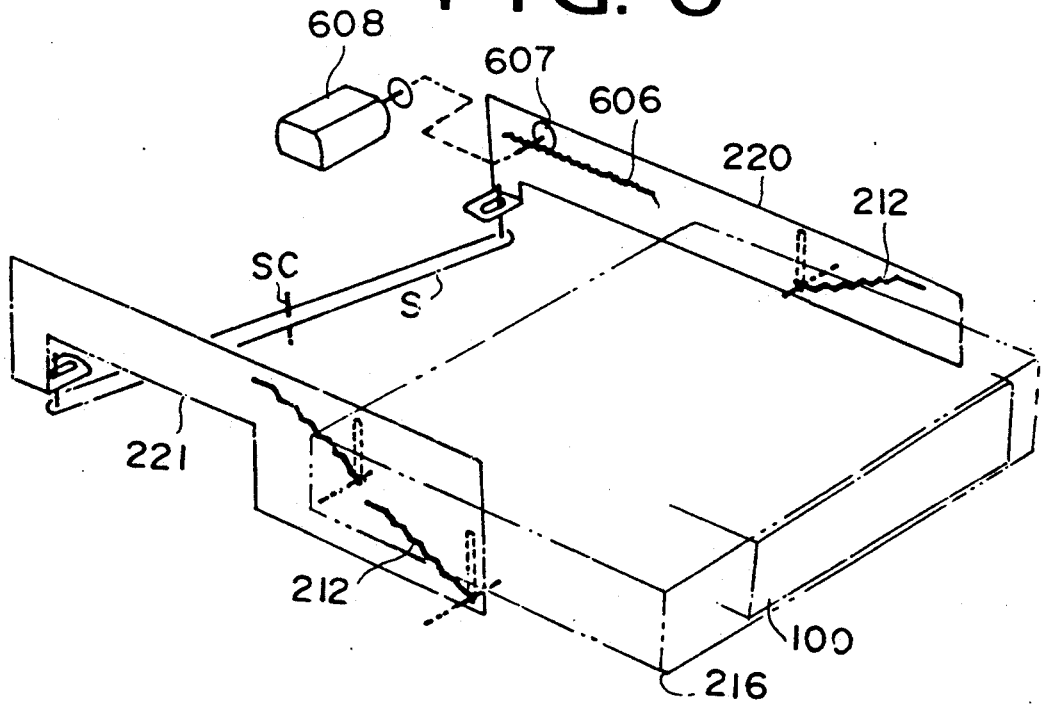

Referring to FIGS. 3, 5 and 6, slide plates 220 and 221 are slidably mounted on inside walls of the side plates 703, respectively. Each slide plate has a guide groove 211 with which a pin 714 on the side plate 703 is slidably engaged so as to guide the slide plate in the longitudinal direction. Both slide plates are connected by a lever S as shown in FIG. 5. The lever S is pivoted at a central portion SC, so that both slide plates are moved in the opposite directions. Each slide plate has a stepwise supporting groove 212 having a plurality of steps 213.

The number of the steps is the number of the CD stowed in the magazine, that is six in the embodiment. In each groove, a pin 215 provided on a projection 214 projected from the magazine holder 216 is slidably engaged. Both the supporting grooves 212 are inclined in the opposite directions, so that the magazine holder 216 is vertically moved when the slide plates 220 and 221 move in the opposite directions.

On the slide plate 220, a position detector plate 230 having six slits 231 is formed, corresponding to the vertical position of the magazine holder.

A photosensor 232 is provided to detect the position of one of the slits 231, that is the position of the CD to be played.

The slide plate 220 has a rack 606 on an upper edge thereof, with which an end gear of a gear train 607 engages. The other end gear 609 of the gear train 607 is secured to a rotating shaft of a motor 608 mounted on the frame 700.

On the magazine holder 216, a swing lever 240 having a magazine abutting end 256 and a switch operating end 254 is pivotally mounted by a pin 241. The lever 240 is urged by a spring 242, so that an end 244 is abutted to a projection 243.

Figure 2A:
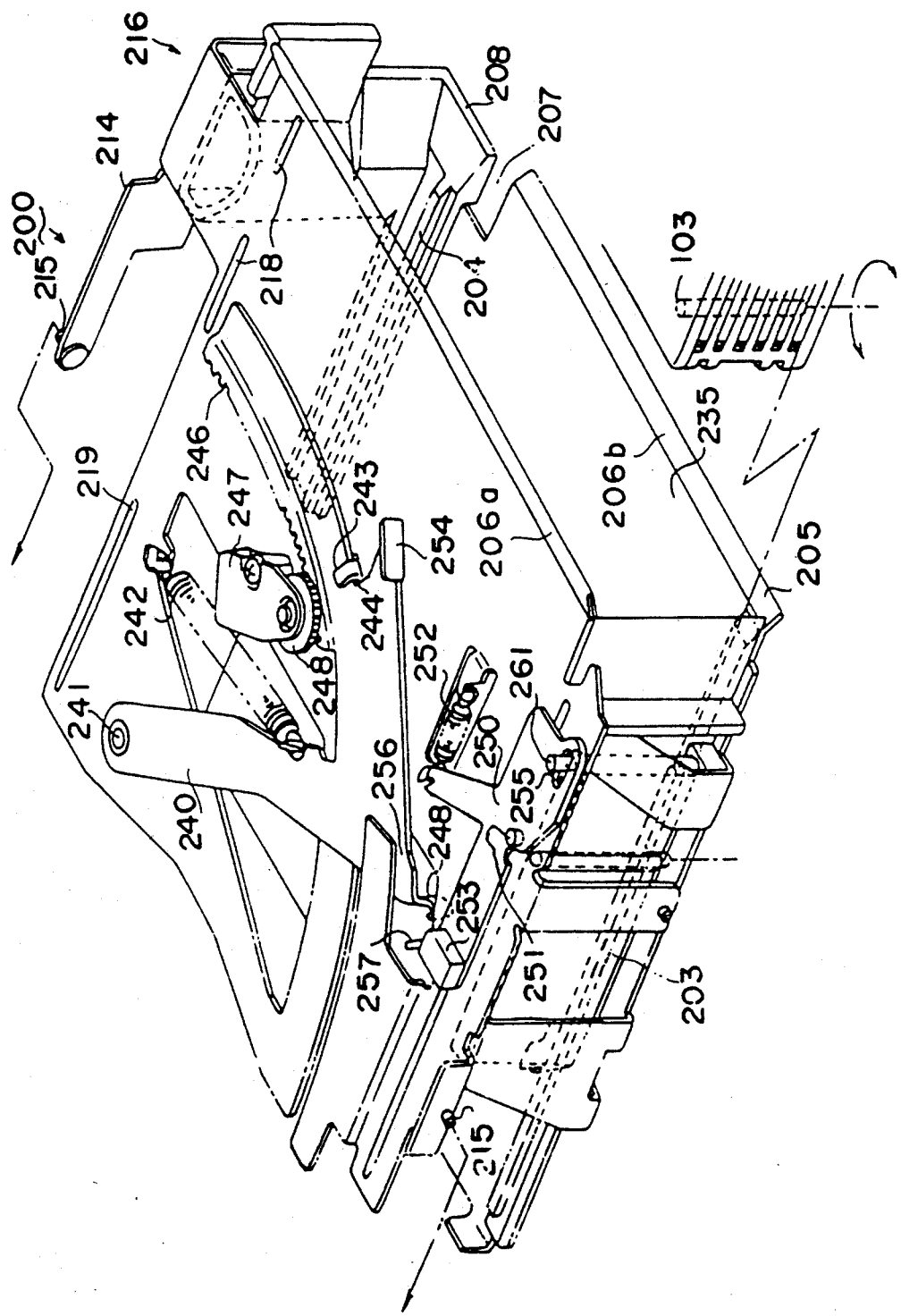

As shown in FIG. 2a, the swing lever 240 has a plurality of teeth 246 formed on an inner side of an arcuated portion. The teeth 246 engages with a gear 248 of a governor 247. The resistance generated by the governor 247 increases as the rotational speed of the gear 248 increases, thereby maintaining the speed of the swing lever 240 constant when rotated in the counterclockwise direction by the urging of the spring 242.

A lever 250 is pivotally mounted on the magazine holder 216, pivotted by a pin 251. The lever 250 is urged by a spring 252, abutting a side of an elongated hole 255 formed therein on a pin 261. A switch 253 is mounted on the lever 250 so that an actuating lever 257 thereof is operated by the switch operating end 254.

The magazine holder 216 has an opening 205 for receiving the magazine 100 and a bottom 235. On the bottom 235, an elongated plastic guide 204 is attached at an entrance zone of the magazine holder 216.

Upper and lower guide portions 206a and 206b are formed on the upper and lower edges of the magazine holder 216 at the inlet 205. The guide portions 206a and 206b are inclined upwardly and downwardly, respectively, as shown in FIG. 7b, so as to facilitate the insertion of the magazine 100 in the holder 216. The magazine 100 has upper and lower projections 107 on one of the sides thereof as shown in FIG. 2b. Accordingly, the lower guide portion 206b has a recess 207 at a position opposing the lower projection 107. A downward inclining guide portion 208, the edge of which is at an inner position than the guide portion 206b is formed at the recess 207.

The magazine holder 216 has a guide rail 203 on the bottom thereof at the opposite side of the plastic guide 204. The guide rail 203 engages with a longitudinal elongated guide groove 105 formed on the underside of the magazine 100.

Figure 8A:
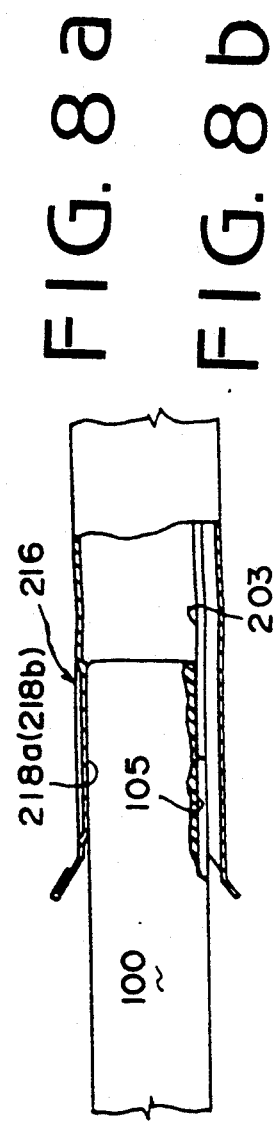
FIGS. 8a and 8b are a sectional side view and a plan view showing a guide rail, respectively.
Figure 8B:
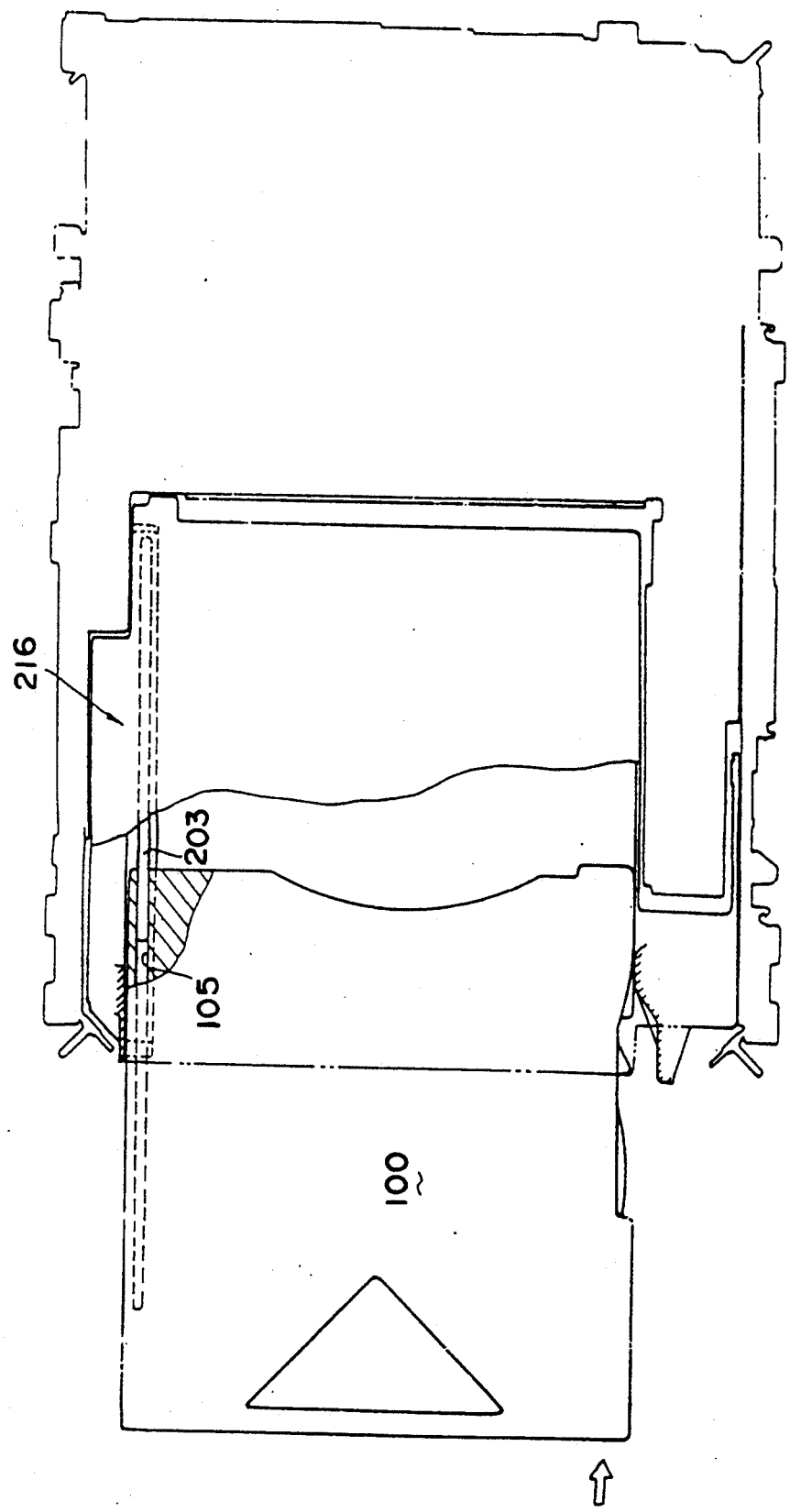

On the upper inner wall of the magazine holder 216, a pair of longitudinally extending restriction ribs 218a and 218b are parallelly formed adjacent the inlet 205, so as to abut against the magazine 100 (FIGS. 8a and 8b). The rib 218a opposes the guide rail 203 and the rib 218b opposes the plastic guide 204. Each of the ribs 218a and 218b may be of one long rib or may comprise a plurality of aligned short ribs.

Figure 9:
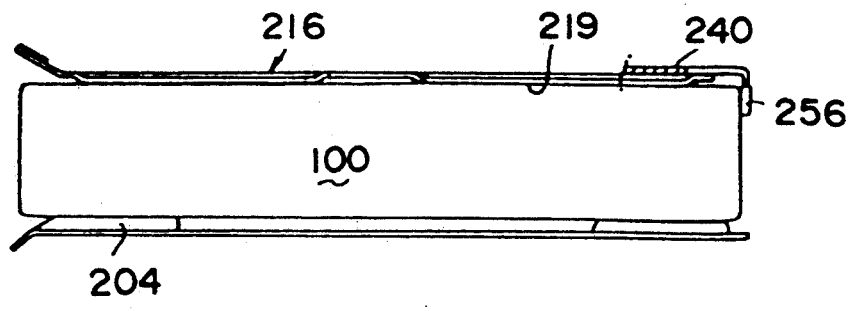
FIG. 9 is a sectional view showing another example of the magazine holder.

In another example of the magazine holder, as shown in FIG. 9, a pair of restriction ribs 219 is formed on the upper inner wall of the magazine holder 216 at the right and left sides thereof. The ribs 219 are adjacent to a longitudinal end of the holder 216 where the magazine abutting end 256 of the swing lever 240 is positioned when the lever 240 is rotated upon insertion of the magazine 100. Namely, the ribs 219 oppose the front end portion of the magazine 100 when inserted in the holder 216. The ribs 219 are similar to the ribs 218a and 218b in that the ribs extend in the longitudinal direction in parallel with each other. The ribs 219 prevent the front end portion of the magazine 100 from being lifted.

A motor 601 is mounted on the frame 700 for driving various mechanism. Securely mounted on a rotating shaft of the motor 601 is a worm 602 which is engaged with a worm wheel 604 rotatably mounted on a supporting plate 640. A thrust screw 603 is mounted on the plate 640 so as to receive the thrust of the worm 602. By rotating the screw 603, the gap between the screw and the end of the worm is adjusted.

The worm wheel 604 operatively connected through gears 605 and 606 to a teeth 611 formed on a periphery of a disk cam 610 so as to rotate the cam.

Figure 10:
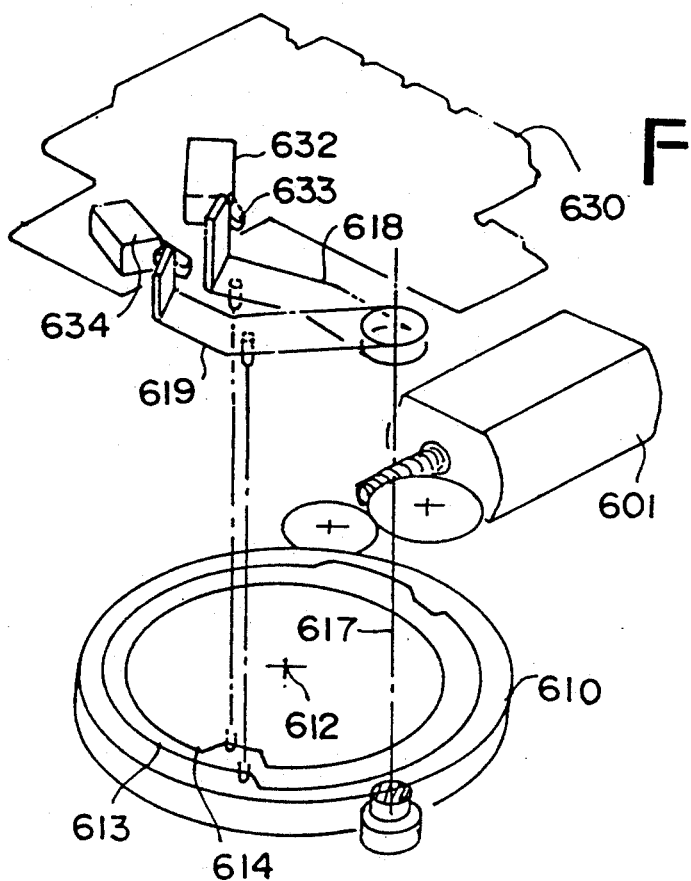
FIGS. 10 and 11 are perspective views showing a cam operated switches.
Figure 11:
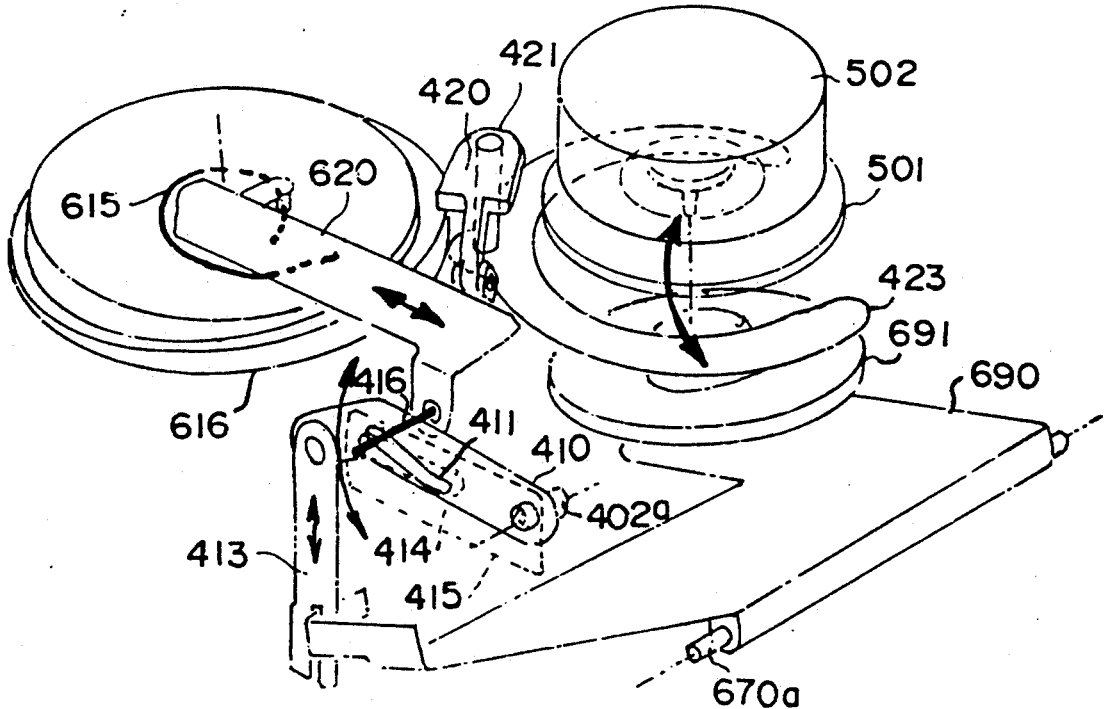

Referring to FIGS. 10 and 11, the disk cam 610 is pivotally mounted on a shaft 612 and has three cam grooves 613, 614 and 615, and a projected cam 616. A pair of levers 618 and 619 pivotted on a pin 617 engage with the cam grooves 613 and 614 at engaging ends, respectively. Engaged with the cam groove 615 is a slide lever 620 having an engaging pin 416 and provided to be moved by the cam groove 615 in the longitudinal direction of the player.

Above the cam 610, a substrate 630 is secured to the shaft 612 by a screw 631 (FIG. 3a). On the substrate 630, a tray position detecting switch 632 and a CD position detecting switch 634 are mounted. The switches 632 and 634 are adapted to be operated by the levers 618 and 619.

When the tray 101 is in the magazine 100, the cam 610 is at an initial position where the lever 618 engages with an operating rod 633 to close the switch 632. The cam 610 starts to rotate for loading the CD, and the lever 618 separates from the rod 633 to open the switch. When the CD is clamped on a turn table as described hereinafter, the lever 618 engages with the rod 633 to close the switch again. Namely, the switch 632 produces output signals when the CD is in the magazine and at the clamping position, and when CD starts to move from the magazine and from the clamping position.

Figure 12:
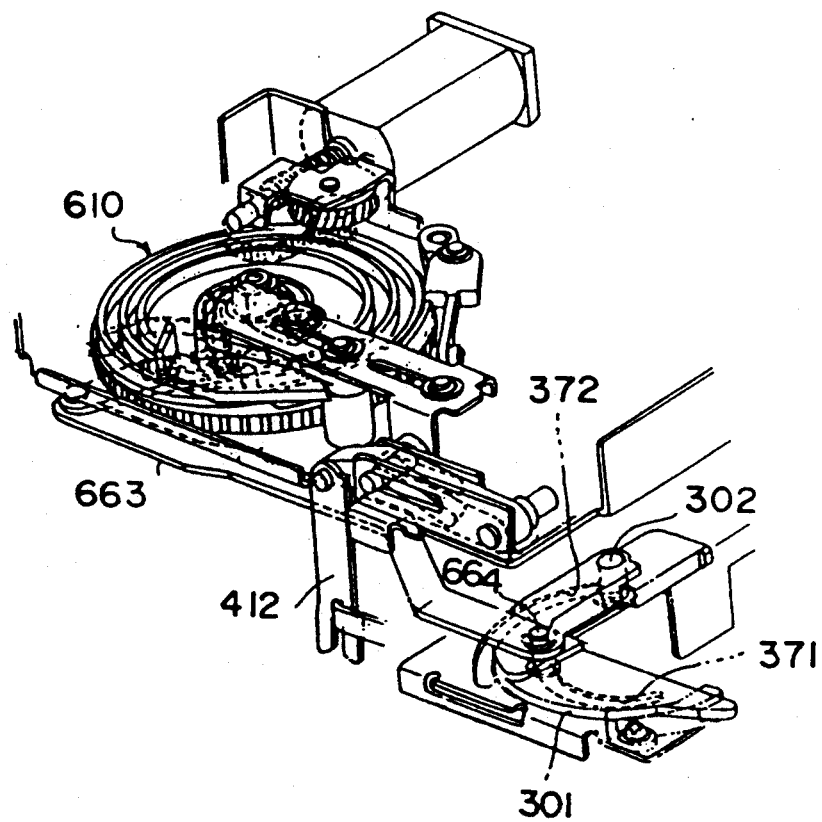
FIGS. 12 to 14 are perspective views showing a tray loading device.
Figure 13:
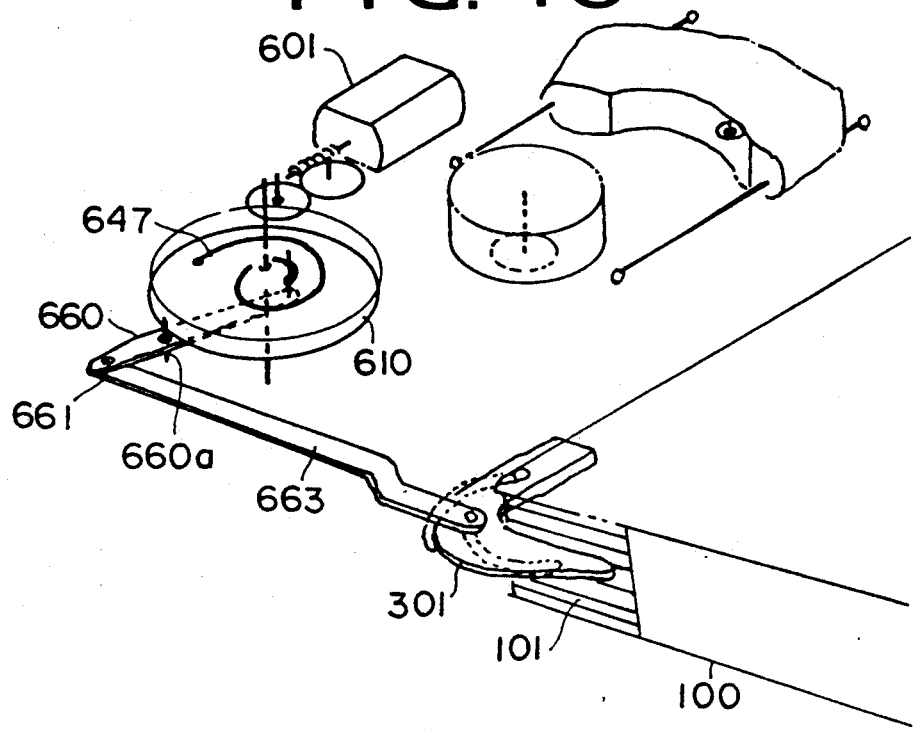
Figure 14:
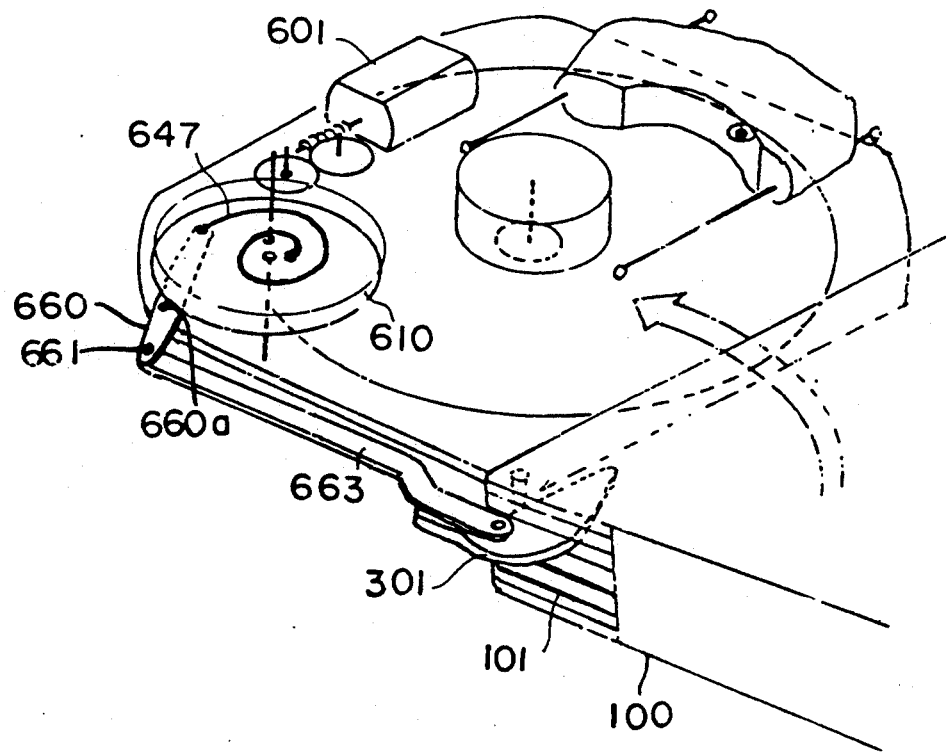

Referring to FIGS. 12 to 14, on the underside of the cam 610, a cam groove 647 is provided for loading the tray 101. An end of a lever 660 pivotted at 660a is slidably engaged with the cam groove 647, and the other end of the lever is connected to an end of a connecting link 663 by a pin 661. The other end of the link 663 is connected to the loading lever 301 by a pin 664.

Figure 15:
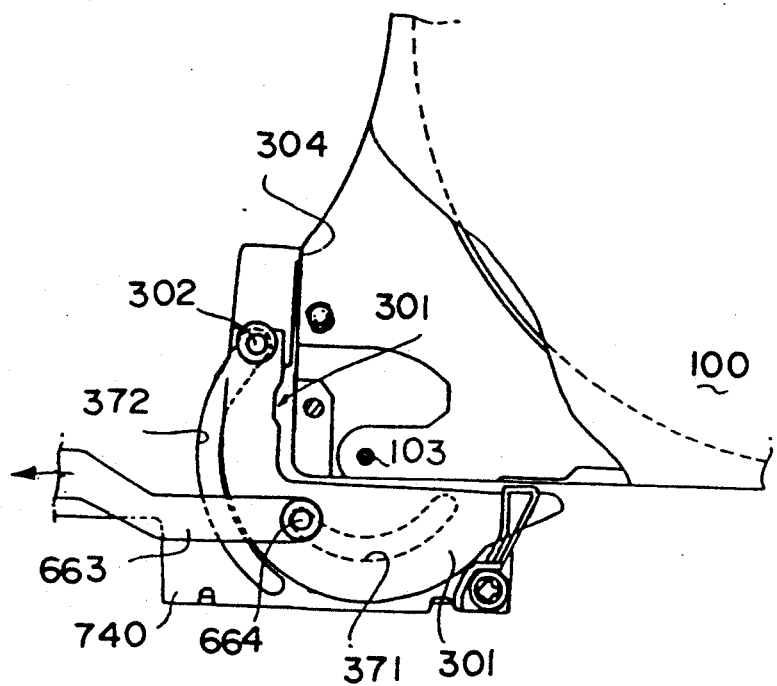
FIGS. 15 and 16 are plan views showing the tray loading device.
Figure 16:
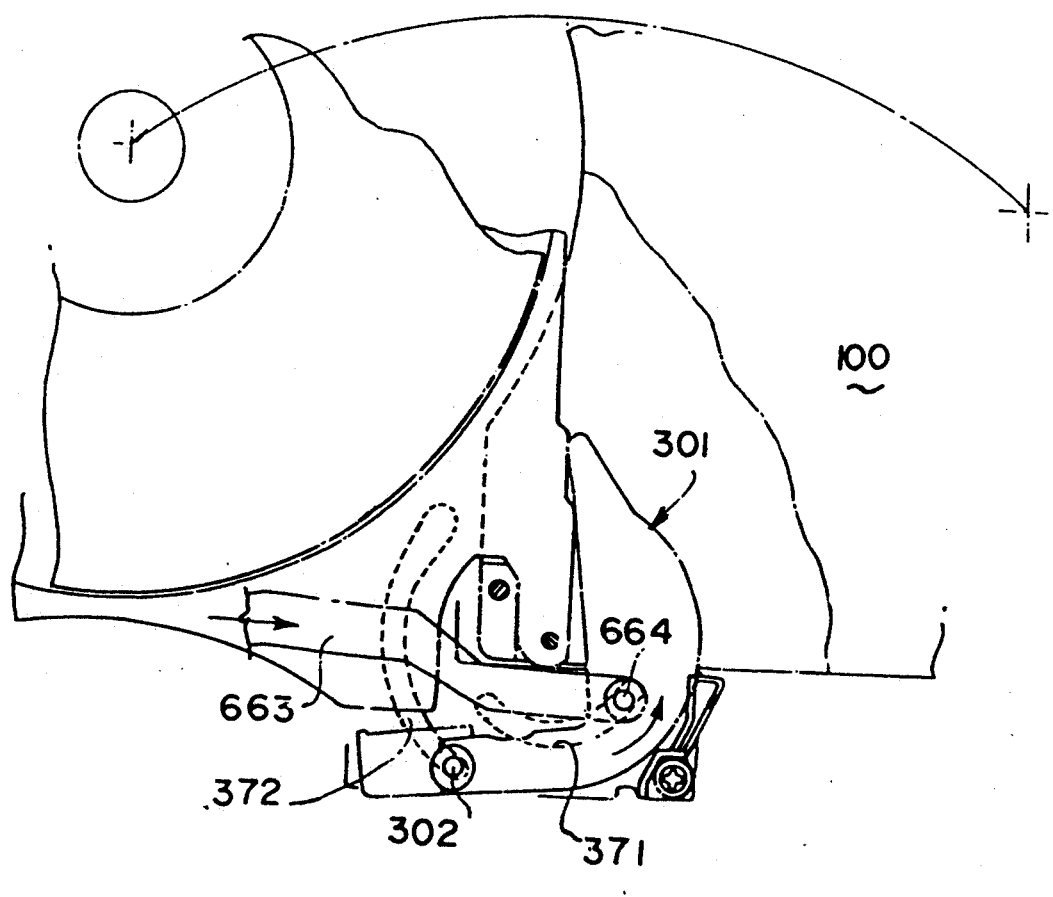

Referring to FIGS. 15 and 16, the loading lever 301 is pivotally mounted on a pin 302 which is slidably engaged with an arcuated slit 372 formed in a frame 740. On the other hand, the pin 664 is slidably engaged with an arcuated slit 371. Both the slits 372 and 371 have arcs with respect to the axis 103. A cam 308 is provided on the frame 740 for guiding the loading lever 303. The lever 303 has a positioning end 304 for positioning the tray 101 in the magazine 100 at the position of FIG. 13.

When the cam 610 rotates in the clockwise direction, the link 663 is moved forward (in the direction to the front part of the player) to turn the loading lever 301 in the counterclockwise direction along the slits 371 and 372.

In an early period, the pin 302 does not move, but only the pin 664 moves, so that the loading lever 301 is turned, guided by the cam 308 on the periphery thereof. Thus, the lever 301 is moved from the position of FIG. 15 to the position of FIG. 16, so that one of trays 101 is pivotted about the axis 103 to the loading position. When unloading the tray, the cam 610 is reversely rotated, so that the loading lever 301 is turned in the reverse direction. The end 304 pushes the tray, thereby turning the tray into the magazine.

Figure 17:
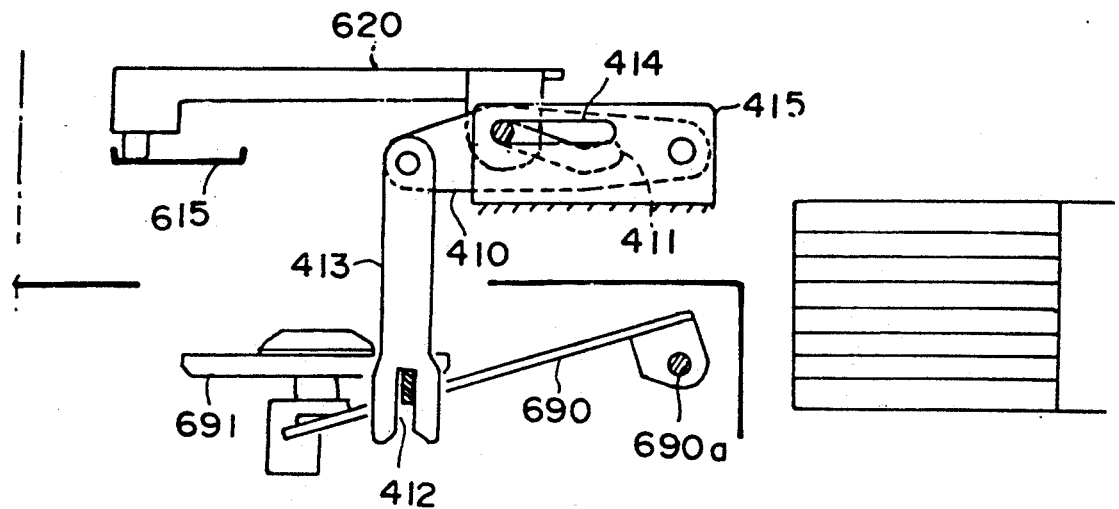
FIGS. 17 and 18 are side views showing cam operated switches.
Figure 18:
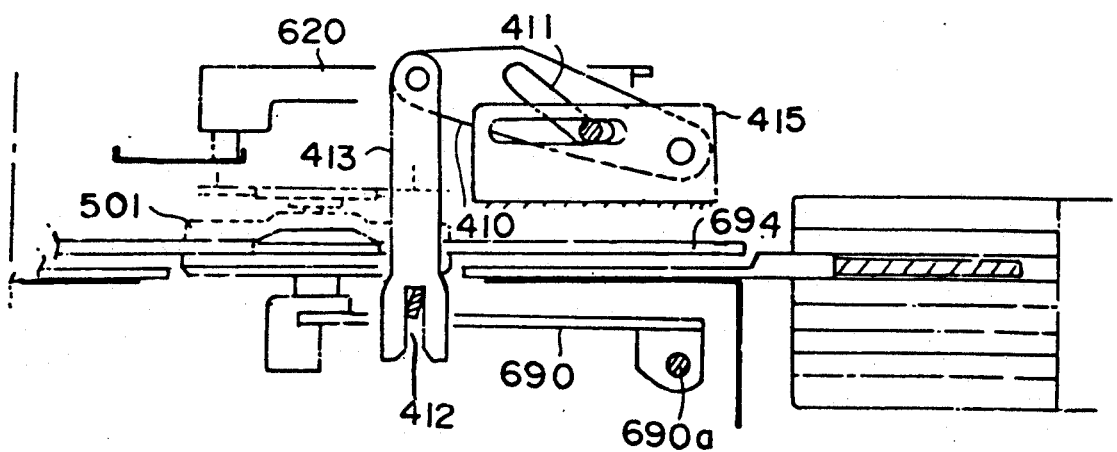

Referring to FIGS. 11, 17 and 18, the engaging pin 416 of the slide lever 620 slidably engages with a horizontal slit 414 of a guide plate 415 and slidably engages with an inclined slit 411 of a lever 410 which is pivotted on a pin 402a. The lever 410 is connected to a vertical lever having an end slit 412 which is engaged with an end of a clamping arm 690. The clamping arm 690 is pivotally mounted on a shaft 690a at an end and connected to a CD clamper 691 at the other end.

When the slide lever 620 is forwardly moved by the cam groove 615, the lever 410 is pivotted in the clockwise direction to elevate the lever 413. Following the lever 413, the arm 690 is upwardly pivotted by a spring (not shown), so that the clamper 691 clamps a CD 694 on the tray 101 projected from the magazine 100 on a turntable 501. The turntable 501 is rotated by a motor 502.

Figure 19:
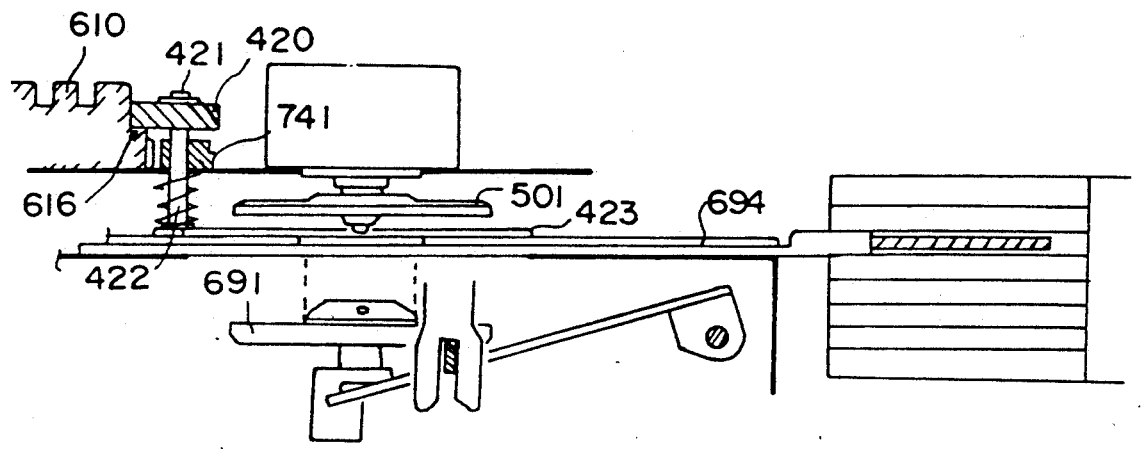
FIGS. 19 and 20 are side views showing a part of a turntable.
Figure 20:
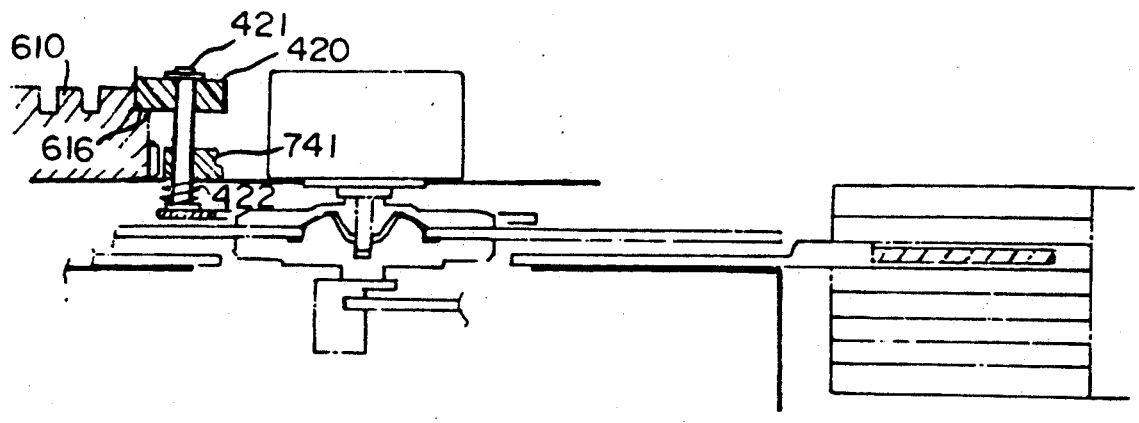

Referring to FIGS. 19 and 20, on the cam 616, a cam follower 420 is slidably mounted. The cam follower 420 is secured to a CD backup lever 423 through a shaft 421 which is slidably mounted in a frame 741. The cam follower is urged to the cam 616 by a spring 422.

When the cam 616 rotates, the cam follower 420 is vertically moved, thereby moving the lever 423, keeping a gap between the lever and the CD. When the CD 694 is clamped on the truntable 501 by the clamper 691, the lever 423 is upwardly moved as the clamper moves. When the CD is removed, the lever 423 is lowered by the cam 616.

Figure 21:
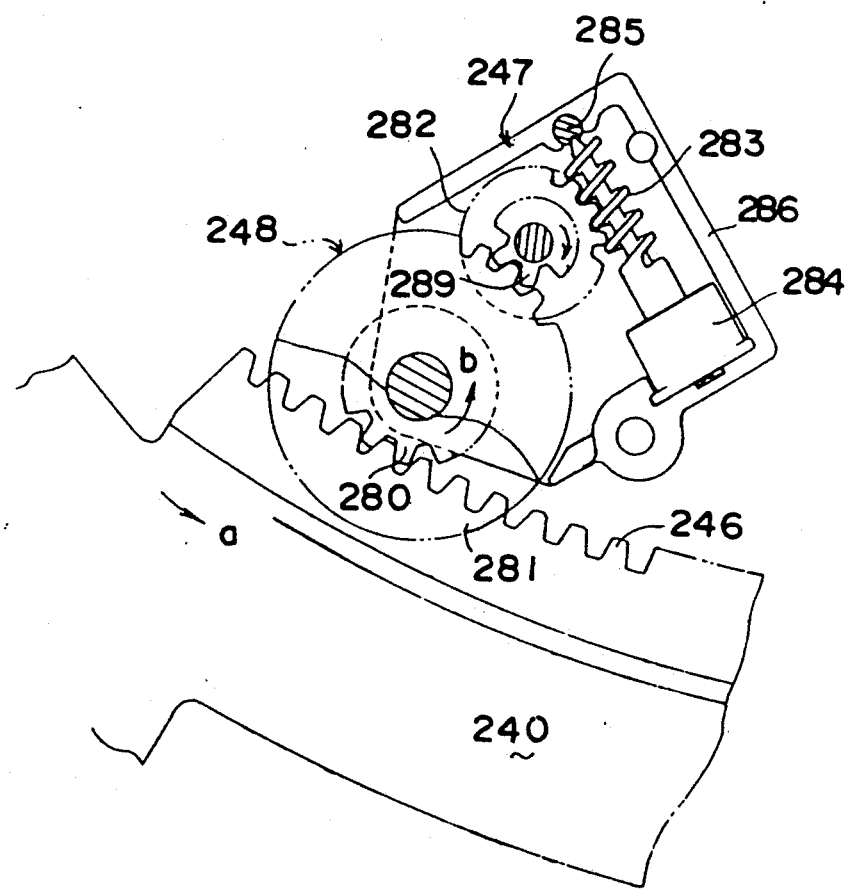
FIG. 21 is a plan view showing a governor.

Referring to FIG. 4, a photosensor P is provided adjacent the tray 101 at the playing position for detecting the existence of the tray. As shown in FIG. 21, the photosensor P produces an output signal having various level according to the level of the reflected beam from the CD and the tray. From the level, the removal of the CD from the turntable can be detected.

Figure 22:
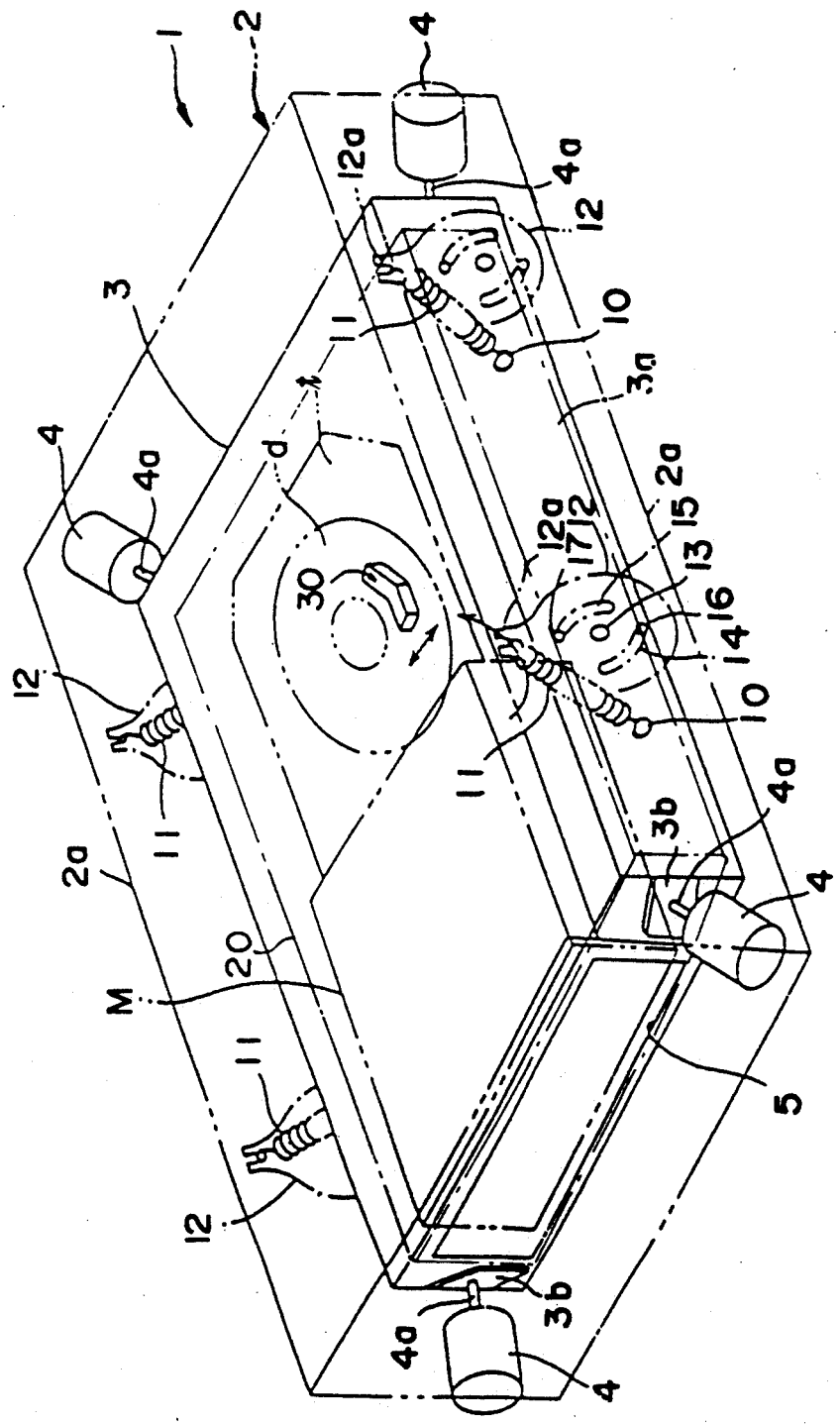
FIG. 22 is a perspective view of a conventional CD player.
Figure 23:
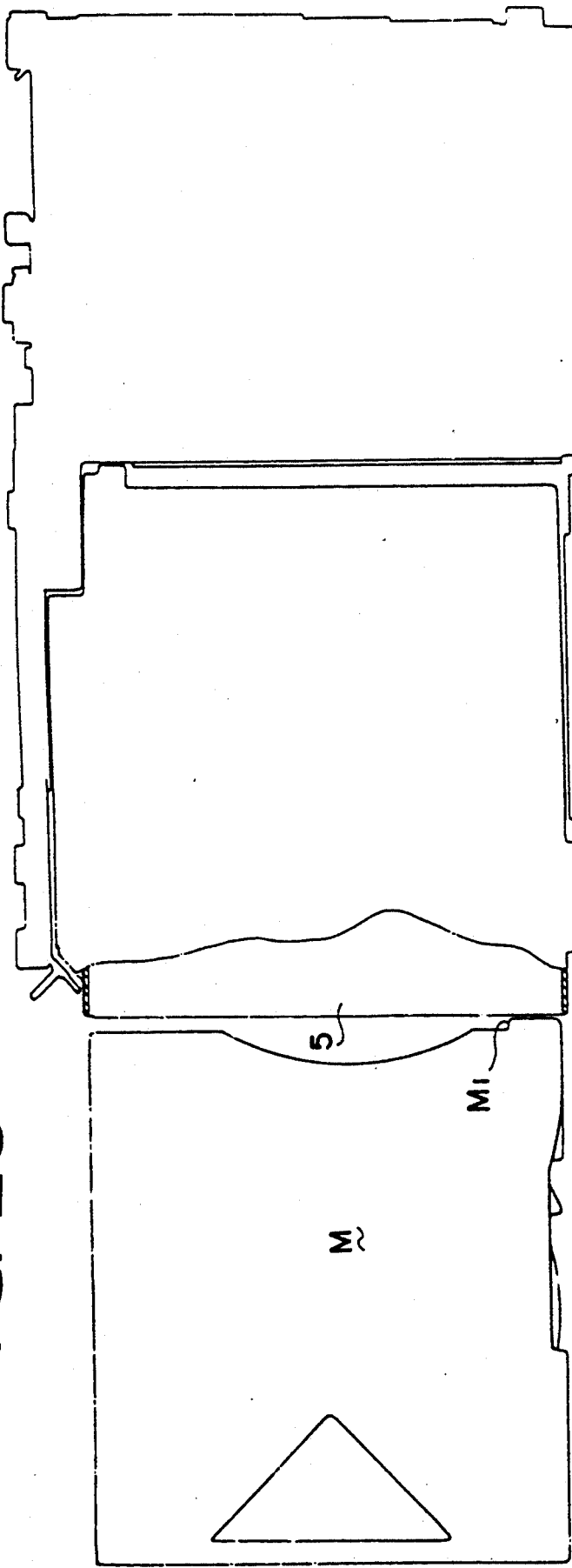
FIG. 23 is a plan view showing a magazine holder in the CD player of FIG. 22.
Figure 24:
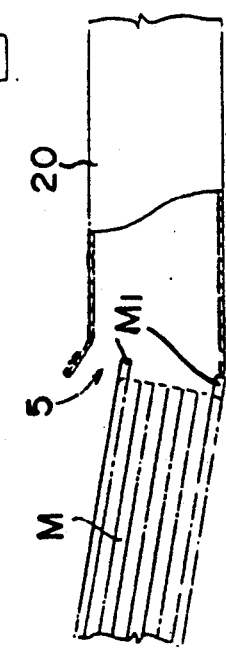
FIG. 24 is a schematic side view showing insertion of a magazine.

The output signals of the photosensor P and the tray position detecting switch 632 are applied to a control unit 800 shown in FIG. 22. A memory 801 stores a program for reading the output signal of various switches and for controlling each motor in accordance with the results of reading the signal.

In operation, the pins 215 of the magazine holder 216 engage with the uppermost steps 213, so that the magazine holder is held at the uppermost position before the playback. The magazine 100 is inserted into the magazine holder 216 from the inlet 205 by hand. The side of the magazine abuts on the end 256 of the swing lever 240 to pivot the lever in the clockwise direction against the spring 242. At the terminal end, the switch operating end 254 engages with the actuating lever 257 of the switch 253, thereby producing a signal representing the completion of the charging of the magazine 100.

The user operates a CD select switch provided on the dashboard of the car, so that the motor 608 starts to rotate the gear train 607. Thus, the slide plate 220 is forwardly moved and the slide plate 221 is rearwardly moved backward to lower the magazine holder 216 to a desired position dependent on the selection of the CD. The desired position is detected by the output signal of the photosensor 232 detecting the slits 231 of the position detector plate 230.

When a play key is operated, the motor 601 starts to rotate the cam 610 in the clockwise direction. As described above, the link 660 and the loading device 300 are operated to load the tray 101 of the selected CD to the playback position A (FIG. 4), and then the CD is removed from the tray by the arm 690 and the clamper 691 and clamped on the turntable 501 by the clamper 691 (FIG. 18). Therefore, the motor 502 is driven to rotate the CD, thereby playing the CD.

When the playing of the CD finishes, the motor 601 operates in reverse to rotate the cam 610 in the counterclockwise direction. Thus, the clamper 691 is lowered, so that the CD is released from the turntable 501 and put on the tray 101. At that time, the CD backup lever 423 is slightly lowered to depress the CD, so that the CD is exactly fitted in the groove 101a of the tray 101. Thereafter the tray is moved to the magazine.

When a lock means for the magazine is released, the spring 242 urges the swing lever 240 in the counterclockwise direction. The lever 240 is rotated at a constant speed due to the governor 247. Thus, the magazine 100 is pushed out of the magazine holder 216 by a projection 249 which projects downwardly from the magazine abutting end 256 of the swing lever 240.

FIG. 21 shows an example of the governor 247 connected to the swing lever 240. The gear 248 of the governor 247 has inner teeth 280 which mesh with the teeth 246 of the lever 240 and teeth 281 which mesh with teeth 289 of a worm wheel 282. The worm wheel 282 engages with a worm 283. The worm 283 is rotatably mounted on a casing 286 through bearings 284 and 285 at both ends thereof.

When the swing lever 240 is rotated in a direction a by the urging of the spring 242, the gear 248 is rotated in a direction b and the worm wheel 282 in a direction c. As the worm wheel 282 rotates, the worm 283 is rotated.

The reaction of the worm 283 exerted on the worm wheel 282 increases as the force exerted on the worm wheel 282 increases, namely, as the rotational speed of the swing lever 240 increases. Thus, the rotation of the swing lever 240 is restricted as the rotational speed increases, thereby decreasing the speed. On the other hand, when the speed of the lever 240 is small, the force exerted on the worm 283 is small so that the lever 240 can be rotated with a small resistance.

Thus, although the CD player designed to be set in a vertical postion is disposed horizontally, the rotational speed of the swing lever 240 by the spring 242 is restrained from increasing by the governor 247. Hence, the magazine 100 is pushed out of the magazine holder 216 at a constant speed.

As hereinbefore described, the inlet 205 of the magazine holder 216 is enlarged by the upper and lower guide portions 206a and 206b formed on the magazine holder 216. In addition, the lower guide portion 208 is formed in the recess 207 of the lower guide portion 206 at the position corresponding to the projection 107 of the magazine.

When inserting the magazine 100 into the magazine holder 216, the magazine 100 is guided by the guide portions 206a and 206b. Even if the magazine 100 is slightly inclined when inserted as shown in FIG. 7b, the projection 107 of the magazine 100 can be smoothly slid on the guide portion 208 without getting caught at the inlet 205.

Hence the magazine 100 is guided by the guide portions 206a, 206b and 208 when inserted even with a slight inclination. Therefore, the magazine 100 can be smoothly and properly disposed in the magazine holder 216 even though the CD player is in an upright position, as well as in a horizontal position.

As described before, the restriction ribs 218a and 218b are thus formed on the upper inner wall of the magazine holder 216 adjacent to the inlet 205 opposing the upper surface of the magazine 100. When inserting the magazine 100 into the magazine holder 216, the guide grooves 105 of the magazine 100 and the guide rail 203 of the holder 216 are engaged as shown in FIG. 8a. Furthermore, the ribs 218a and 218b abut on the upper surface of the magazine 100, thereby maintaining the engagement of the groove 105 with the guide rail 203.

Hence as shown in FIG. 8b, even though the magazine 100 should be inserted by pushing the side of the magazine opposite the groove 105, the groove 105 is not released from the engagement with the rail 203. Therefore, by maintaining the engagement between the guide groove 105 of the magazine 100 and the guide rail 203 of the magazine holder 216, the magazine 100 is smoothly and properly inserted in the holder 216 without deflection in either horizontally disposed or vertically disposed CD player.

As described above, on the upper inner wall of the magazine holder 216 where the front end portion of the magazine 100 confronts when inserted in the holder 216, the ristriction ribs 219 are formed at the right and left side. When the magazine 100 is inserted in the holder 216 against the urging of the lever 240, the magazine abutting end 256 thereof engages the front end of the magazine 100, and the ribs 219 hold the magazine 100 downwardly. Thus, the bottom of the magazine 100 is kept in contact with the guide rail 203 and the plastic guide 204. The ristriction ribs 219, guide rail 203 and the plastic guide 204 are dimensioned relative with one other so as to hold the magazine 100 in a predetermined disposition. Thus, the magazine 100 is properly positioned although the magazine abutting end 256 of the lever 240 urges the magazine 100 to shift at a large force.

In accordance with the present invention, the magazine can be smoothly inserted in the magazine holder through the inlet provided with guide portions. Moreover, one of the side end of the lower guide portion is cut away so as to allow the magazine to enter through the opening without the corner of the magazine being obstructed when the magazine is vertically tilted. The present invention is particularly effective for inserting a magazine having projections for protecting the trays mounted therein.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A magazine holder in a CD player having a magazine containing a plurality of trays for mounting each of a plurality of CD's respectively, each of the trays being pivotally mounted on a shaft provided at a corner of a front side of the magazine so that each tray is rotated about an axis of said shaft and moved form the magazine holder to a playback position while passing through an opening formed on the front side and a lateral side adjacent the front side and opposite to said shaft, the magazine holder having an inlet for inserting the magazine, comprising:

the magazine having upper and lower projections on a front side thereof at a position opposite to the shaft;

an upwardly inclined guide portion and a first downwardly inclined guide portion formed on an upper edge and a lower edge of the inlet; and a second downwardly inclined guide portion formed on the lower edge of the inlet a position located inwardly of the first downwardly inclined guide portion and corresponding to a position of the lower projection of the magazine relative to the width of said inlet.

2. The magazine holder according to claim 1, wherein the upper and lower projections are provided at one of a right and a left end portion of the front side of the magazine.

* * * * *